US005681223A

United States Patent [19]

Weinreich

[11] Patent Number: 5,681,223
[45] Date of Patent: Oct. 28, 1997

[54] TRAINING VIDEO METHOD AND DISPLAY

[75] Inventor: Stephen Weinreich, Monmouth Junction, N.J.

[73] Assignee: Inventures Inc, Parsippany, N.J.

[21] Appl. No.: 109,506

[22] Filed: Aug. 20, 1993

[51] Int. Cl.⁶ ........ G02B 5/08
[52] U.S. Cl. ........ 472/61; 358/906
[58] Field of Search ........ 472/61; 364/460, 364/410; 358/906; 600/921; 348/207, 239

[56] References Cited

U.S. PATENT DOCUMENTS

| | | | |
|---|---|---|---|
| 922,722 | 5/1909 | Salle . | |
| 936,344 | 10/1909 | Myers . | |
| 1,236,196 | 8/1917 | MacQuesten . | |
| 1,775,237 | 9/1930 | Dawley et al. . | |
| 1,785,347 | 12/1930 | Herrschaft | 472/61 |
| 1,822,808 | 9/1931 | Gordon | 472/61 |
| 1,973,665 | 9/1934 | Shannon et al. . | |
| 2,075,198 | 3/1937 | Henze | 472/61 |
| 2,146,386 | 2/1939 | Todd | 472/61 |
| 2,165,736 | 7/1939 | Twele . | |
| 2,222,084 | 11/1940 | Marx . | |
| 2,232,110 | 2/1941 | Gruenhut | 472/61 |
| 2,232,547 | 2/1941 | Mathias | 472/61 |
| 2,273,259 | 2/1942 | Gosling, Jr. . | |
| 2,293,271 | 8/1942 | Von Knauf . | |
| 2,297,844 | 10/1942 | Shoemaker . | |
| 2,494,000 | 1/1950 | Robertson . | |
| 2,875,528 | 3/1959 | Garate . | |
| 2,899,860 | 8/1959 | Scott et al. . | |
| 3,000,261 | 9/1961 | Frenkel . | |
| 3,507,570 | 4/1970 | Bourdier | 472/61 |
| 3,729,839 | 5/1973 | Bourdier . | |
| 4,072,314 | 2/1978 | Rosen et al. . | |
| 4,094,501 | 6/1978 | Burnett | 472/61 |
| 4,157,633 | 6/1979 | Reiner | 472/61 |
| 4,273,418 | 6/1981 | Gillespie et al. . | |
| 4,297,724 | 10/1981 | Masuda et al. . | |
| 4,641,255 | 2/1987 | Hohmann . | |
| 4,677,470 | 6/1987 | Cooper et al. . | |
| 4,710,873 | 12/1987 | Breslow et al. . | |
| 4,902,117 | 2/1990 | Papp . | |
| 4,908,700 | 3/1990 | Ishii et al. . | |
| 4,971,312 | 11/1990 | Weinreich | 472/61 |

OTHER PUBLICATIONS

SMPTE Journal Jun. 1979 pp. 410–413, Joseph Alexander, "An Infrared Traveling Matte System with Electronic Masking".

*Primary Examiner*—Carl D. Friedman
*Assistant Examiner*—Beth Aubrey

[57] ABSTRACT

Method and display for training and other uses, which may be in the form of a special video, diorama, or print format. The preferred embodiment shows a bright visual image against a dark background. This invention is particularly useful in the Illusion Apparatus of U.S. Pat. No. 4,971,312 and in an electronic system also disclosed.

39 Claims, 9 Drawing Sheets

TRAINING VIDEO METHOD AND DISPLAY

BACKGROUND OF THE INVENTION

The present invention relates to an illusion apparatus and method using same. More particularly, this invention relates to a unique background display for an illusion apparatus and method for creating an illusion wherein a pre-recorded bright image on a dark background is made to appear to be inserted within the environment of the viewer. My prior U.S. Pat. No. 4,971,312, Illusion Apparatus, discloses an optical element used in conjunction with printed matter, diorama, video, or other display means. In that patent, a dark area in the display is provided to receive the viewer's image. The present invention provides an improved display and also provides a unique format to enhance the effect provided by my prior invention.

INTRODUCTION

Aspects of this invention are applicable to various forms of display, particularly video presentations. The video presentations may be live, prerecorded, or computer generated.

The invention also particularly pertains to video created for the purpose of training an individual in some physical skill such as exercise or dance, it is not, however, limited to training and may be used for other presentations as will be clear from the following.

SUMMARY OF THE INVENTION

In one aspect of the invention there is provided an illusion apparatus for making an object appear to be inside or on the surface of a display. The display may be, for example, a video image on a television monitor, a printed display, or a diorama. The apparatus includes a display in which a bright image, for example, of one or more humans, such as a training instructor or instructors, or a cartoon figure or other animated figure or inanimate object, etc. appears on a dark background; and image projection means for projecting an image of an object (usually the viewer) and the environment immediately surrounding the object on the dark background of the display. As a result, the bright image appears to be inserted into the environment (e.g. living room, studio, etc.) of the object.

In another aspect, the invention provides a method for making a bright image of an object of a display, which may be a still or action display, appear to be inserted within the environment of a viewer of the display. The method involves the steps of providing a display in which a bright image appears on a dark (e.g. black) background, and projection of an image of the viewer and the viewer's environment onto the dark background of the display. As a result, the bright image appears to be within the environment (e.g. living room) of the viewer.

DETAILED DESCRIPTION OF THE INVENTION AND PREFERRED EMBODIMENTS THEREOF

Figure 1A:
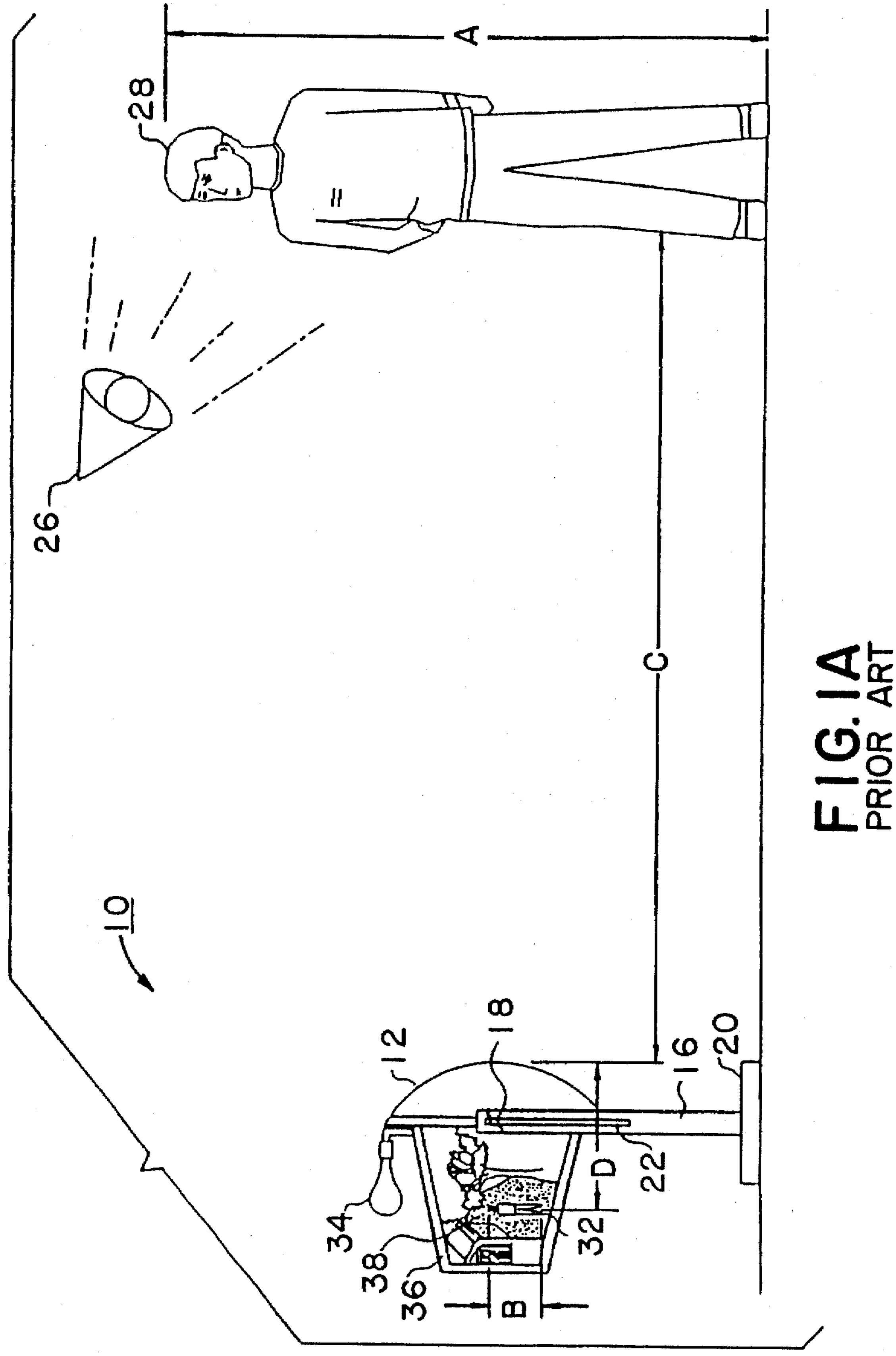
FIG. 1A PRIOR ART
FIGS. 1A, 1B, 1C & 1D are from prior art U.S. Pat. No. 4,971,312, herein incorporated by reference.
Figure 1B:
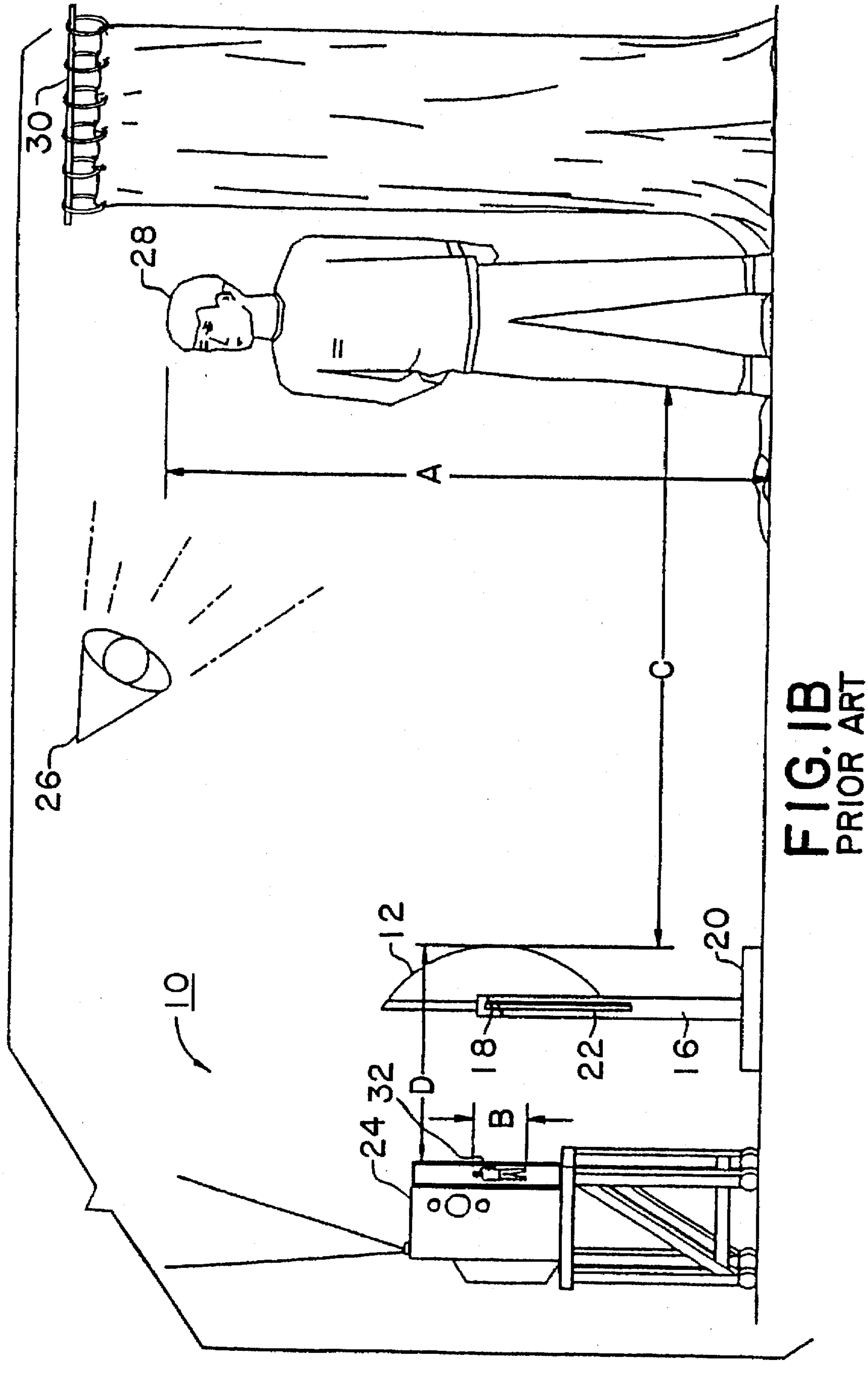
FIG. 1B PRIOR ART

The prior art from U.S. Pat. No. 4,971,312, herein incorporated by reference, is illustrated in FIGS. 1A, 1B, 1C and 1D. In FIG. 1A the display is a diorama, while in FIG. 1B the display is a video image of a TV monitor. Darkened area 38 receives the image 32 of viewer 28. In this case, the shape of the darkened area bears no direct relation to the shape of the viewer. The substance of the scene in the diorama does not begin at the periphery of the viewer image. In fact, the viewing environment may show as part of the composite image. This is an annoyance that can be ameliorated by vignetting the darkened area in the diorama, by leaving the viewing environment unlit, or by providing a dark drape behind the viewer as shown in FIG. 1B.

Figure 1C:
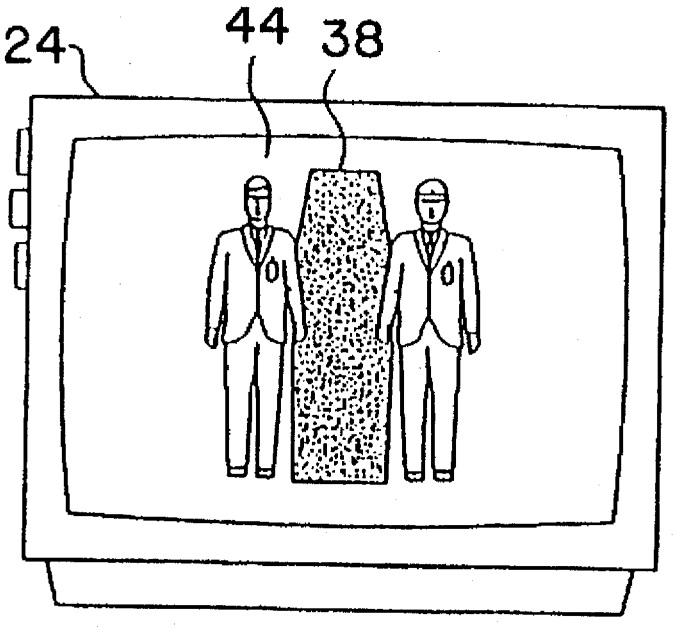
FIG.1C PRIOR ART
Figure 1D:
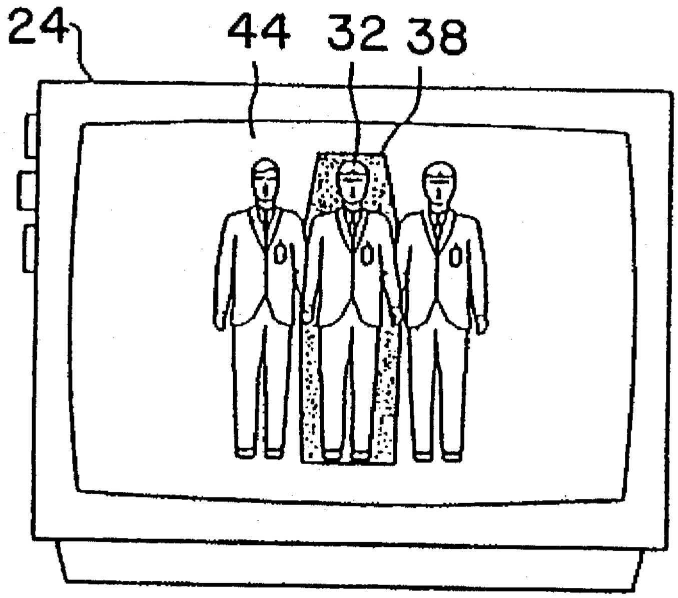
FIG.1D PRIOR ART

In FIG. 1C, a darkened area 38 is provided in a video display. As shown in FIG. 1D, the viewer's image fits within, but does not fill the darkened area. Here also, there is an ambiguous area which is neither scene nor viewer, but which can be minimized as mentioned above.

It is desirable to create a more tightly fitted insert or matte. A typical chroma-key video, for example, produces an almost seamless image. Cinema technology, such as travelling mattes and digital laser scanning, also provides invisible matte lines.

Some uses of the Illusion Apparatus of U.S. Pat. No. 4,971,312, previously incorporated herein by reference, allow a display format which can produce excellent quality inserts.

One way to provide well fitted inserts would be for the display's dark area to be shaped more or less like the viewer and for the viewer to move smartly to keep his/her image within the preferably moving, dark area.

At first glance, this does not seem likely to be practical.

It is, however, practical and useful to apply an exactly opposite strategy. It is possible to provide a perfectly fitted matte by making the dark area larger. That is, rather than inserting the viewer into the display, a visual element of the display is instead inserted into the image of the viewing environment. This has several uses. For example, in the case where the display is an action (moving) display. The visual element to be inserted is preferably the image of an individual, particularly that of a trainer or teacher. The trainer thus can appear to be standing beside his/her trainee, the viewer, in the viewer's living room.

Figure 2:
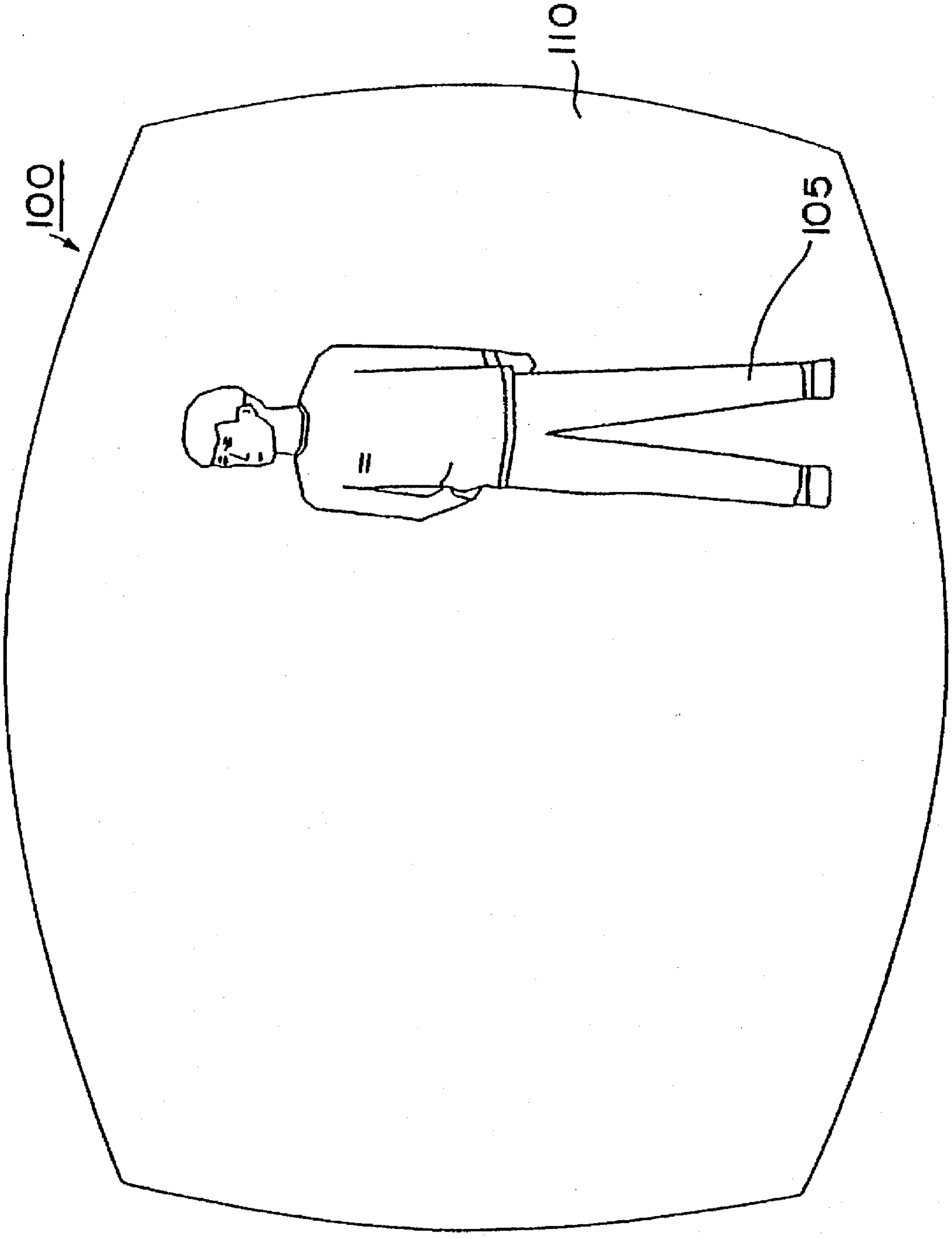
FIG. 2 illustrates a video screen, showing a display according to the preferred embodiment of the invention.

FIG. 2 shows one form of the preferred training video display 100. A bright image 105 of the trainer appears on a solid black background 110. In order for certain activities to seem natural to the majority of viewers and particularly where an activity has only one asymmetrical form, the preferred embodiment requires that the trainer's image be left-right reversed. This is in order that the viewer's mirror image can follow the trainer's lead. Ballroom dancing and the manual of arms are particular examples.

The reversal may be accomplished electronically or the video shot through a mirror.

Although a video, made using a video camera, is the preferred form of display, other video storage means, such as a laser disc, or still ("non-action" type) displays, such as, print, diorama or other display means are possible. A computer generated display, with an assumed camera position is also possible. A matte black box could hold a marionette for insertion into the image of a child's playroom. The marionette could appear as large as the child's image. The background need not, of course, be absolutely and completely black, but could contain, for example, the image of a strip of grass, to support a golf lesson.

The dark background might also contain additional visual elements to be inserted. As non-limiting but illustrative examples, reference may be made to other bright objects, such as bits of fairy dust to accompany a visit from Peter Pan or a shower of stars from a fairy godmother's wand. It is, however, preferable that at least a majority (at least 50%) of the display's area and/or perimeter be dark.

The viewer thus has a wide latitude in position, while the composite image appears to be seamless.

To add to the illusion, it is usually preferable that the trainer or other inserted visual element address the dark space beside him/her/it rather than follow the usual practice of addressing the camera. Thus, the bright image 105 of the trainer has the trainer's head turned to address the viewer's image rather than the viewer.

The illusion effect may also be enhanced by setting the camera elevation in making the display image to the elevation expected for the viewer imaging device to be used at the time of viewing.

Figure 3:
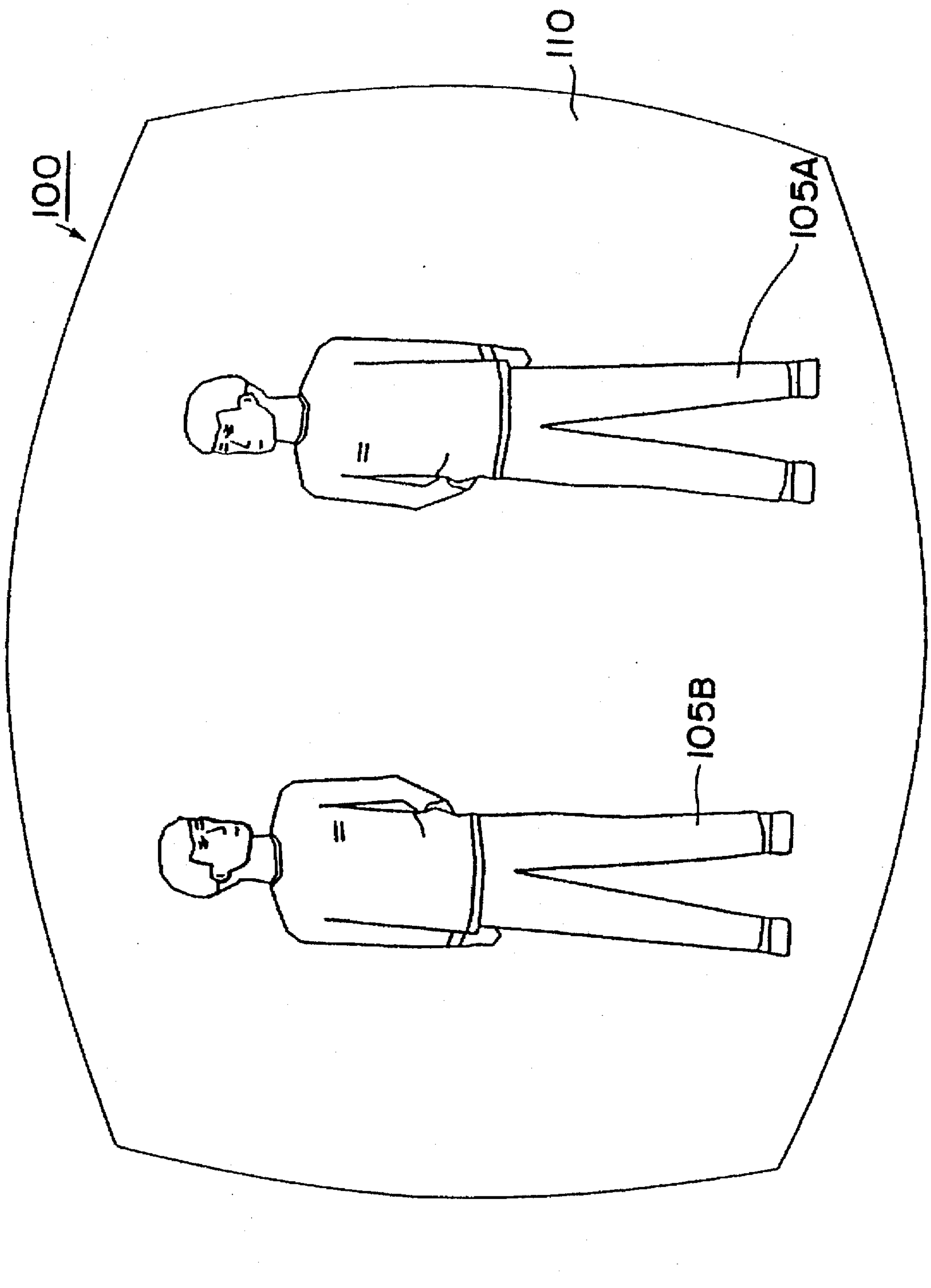
FIG. 3 illustrates a video screen showing a display for right or left handed training according to an alternate embodiment of the invention.

FIG. 3 shows a training video display 100, which is preferred for training in activities such as golf or tennis in which handedness varies and is important. Here, dark background 110 holds two bright images 105A and 105B. Image 105A is a reversed, left handed trainer, 105B is the unreversed image of the same trainer.

For use with the Illusion Apparatus of U.S. Pat. No. 4,971,312, the viewer may cover one image with a black drape or other cover and use the other image as the trainer, or a video switch may be made by ordinary means to delete the undesired portion (e.g. one-half) of the visual field.

Figure 4:
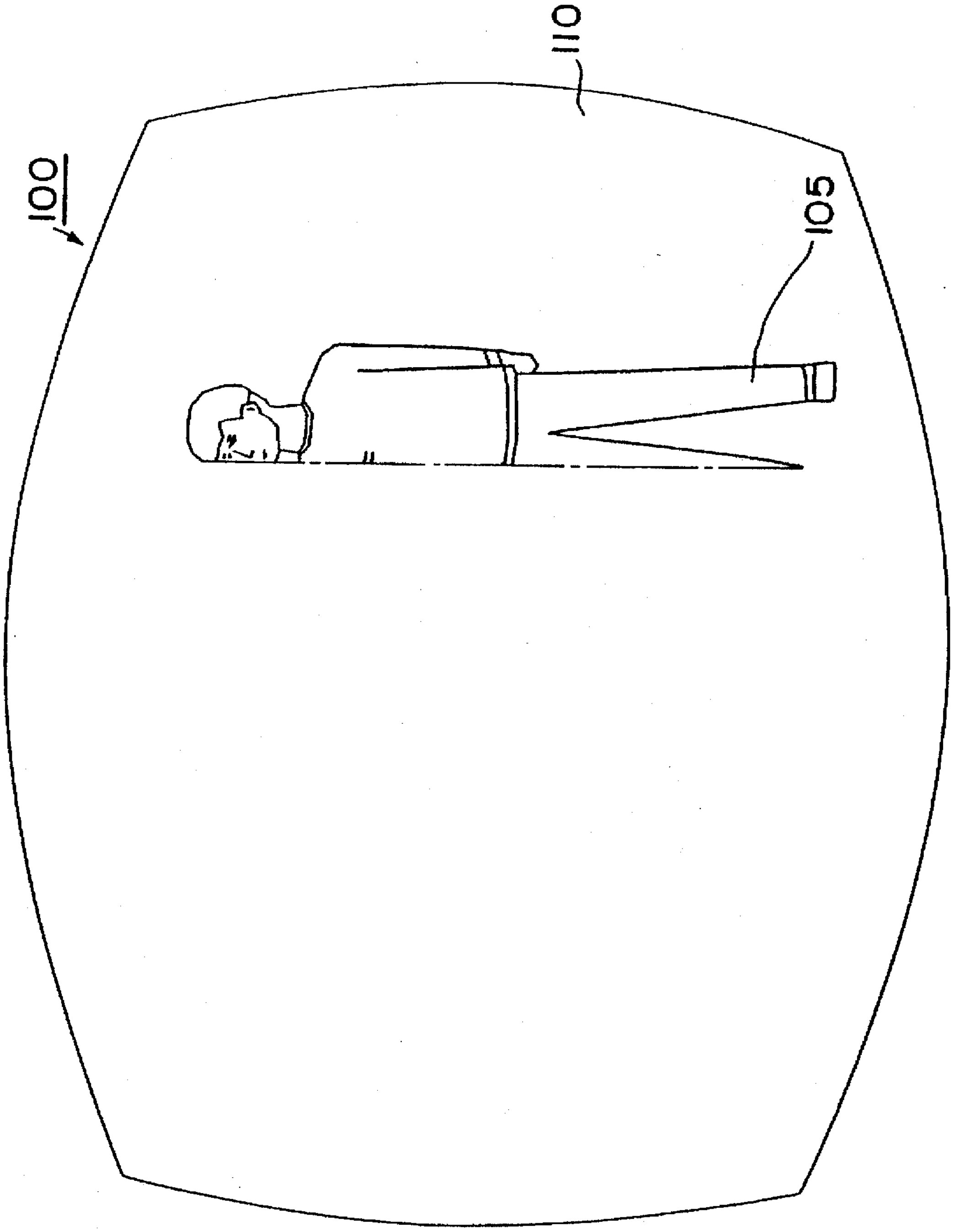
FIG. 4 illustrates a video screen showing a modified display according to the preferred embodiment of the invention.

FIG. 4 illustrates a modified form of the preferred embodiment which enhances the apparent interaction between the bright image 105 of the display 100 and the viewer's image to be inserted.

Here the bright image 105 is interrupted in the area of the background 110 where the viewer's image is likely to be found. This can be accomplished electronically or by a black drape or mask during production of the display 100. Although the interrupted edge will not likely be at all a precise matte line, the accuracy of the remaining edge and a preferably brief time of interaction can form a convincing element of the illusion. For best results the interrupted edge should be vignetted.

The apparatus of this invention and method of creating an illusion includes image projection means for juxtaposing the bright image of the display and the image of the external object (e.g. viewer) and environment of the object. The image projection means, in one embodiment, is that described in my prior issued U.S. Pat. No. 4,971,312, incorporated herein by reference. Briefly, the image projection means includes a partially reflective, partially transparent convex mirror located between the object and the display. The mirror is convex in the direction of the object so as to diminish the size of the projected image of the object, whereby the bright image appears to be within the environment of the object. For further details, reference is made to U.S. Pat. No. 4,971,312.

The training video and other applications wherein visual elements are to be inserted into the image of the viewer's environment do not, however, require the use of the image projection means of the Illusion Apparatus disclosed in U.S. Pat. No. 4,971,312, but permit application with an electronic display and video imaging system.

Figure 6:
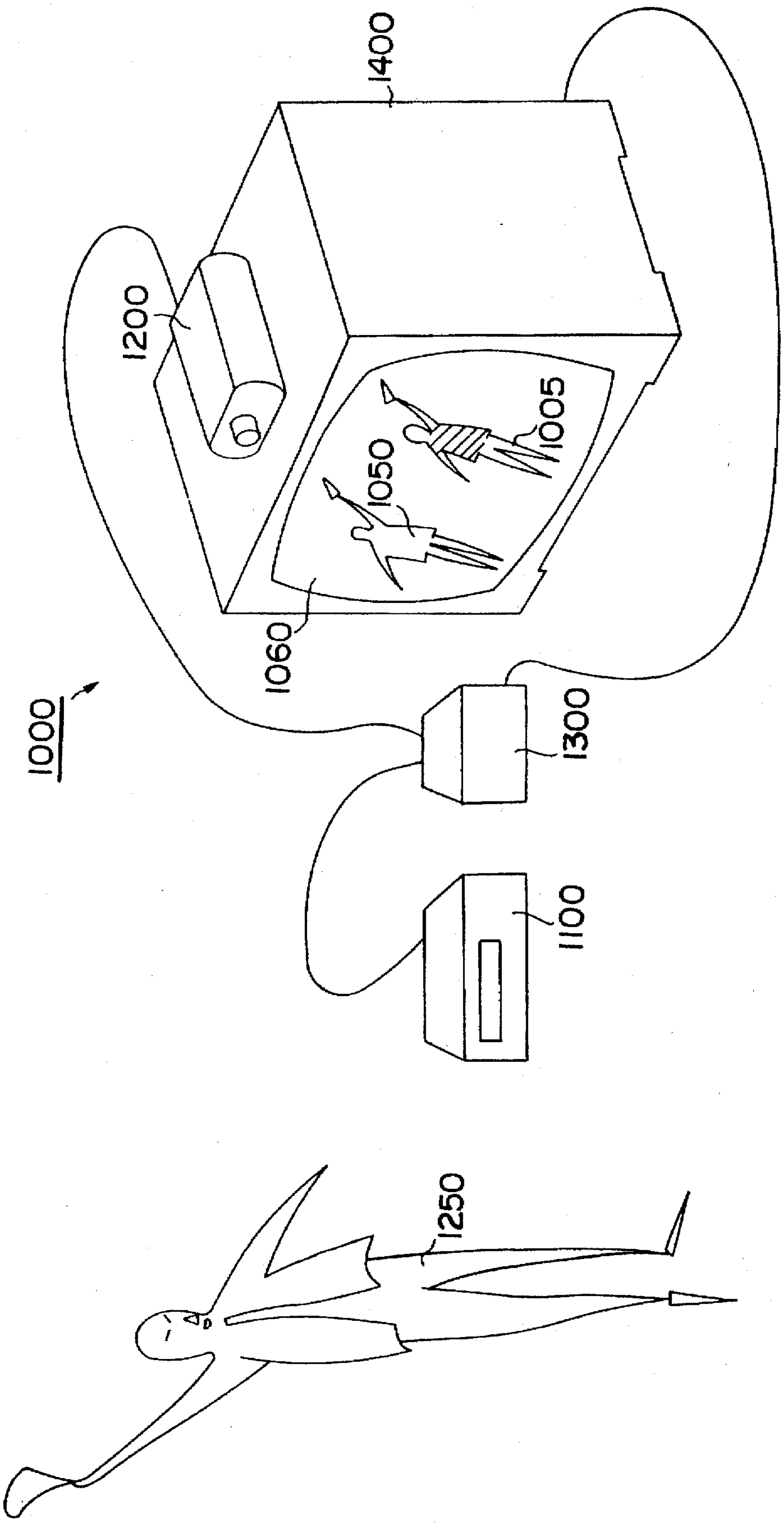
FIG. 6 illustrates an electronic system utilizing the invention.

FIG. 6 shows an electronic system 1000 which can use the training videos disclosed herein. This system is compatible with video produced for use with the Illusion Apparatus of the prior art and is preferred for large video displays.

An ordinary VCR 1100 (VHS, Super VHS, 8 mm, etc.) is used to play a prerecorded videotape bearing the bright image 1005 of the trainer, storyteller, fairy godmother or other visual element against a black background. Instead of an ordinary VCR a laser disc player or CD Rom player, etc. may be used to provide the display according to this invention. The image of the display is delivered to luminance key 1300 by ordinary means.

Video camera 1200 captures the image 1050 of viewer 1250 within the image of the viewing environment 1060. The image of viewer and environment is also delivered by ordinary means to luminance key 1300.

Luminance key 1300 includes means, well known in the art, to cause left-right reversal of the image from camera 1200, inserts the reversed image into the dark area of the image from VCR 1100, and transmits the composite image to video monitor 1400, all by ordinary means. Alternatively, the left-right reversal means may be provided as a separate unit connectable to the luminance key and to the video camera or VCR in any desired order. As still a further alternative, the left-right reversal means may be included in the video monitor, and such types of monitors are also commercially available.

Because of the left-right reversal, the video system 1000 acts like a mirror, rather then like ordinary video. This can also be accomplished by optical means, as by a prism or mirror in front of the camera lens, but in any case provides a reversed image. The reversed image is far easier than a true image for the viewer to understand and imitate while attempting to follow the trainer.

This is true for insertions of the viewer, with or without the viewer's environment, into a composite image to be watched by the viewer. Other methods of insertion to which this could be applied include chroma-key and the difference key of Barnett et al U.S. Pat. No. 4,800,432, incorporated herein by reference thereto.

Figure 7:
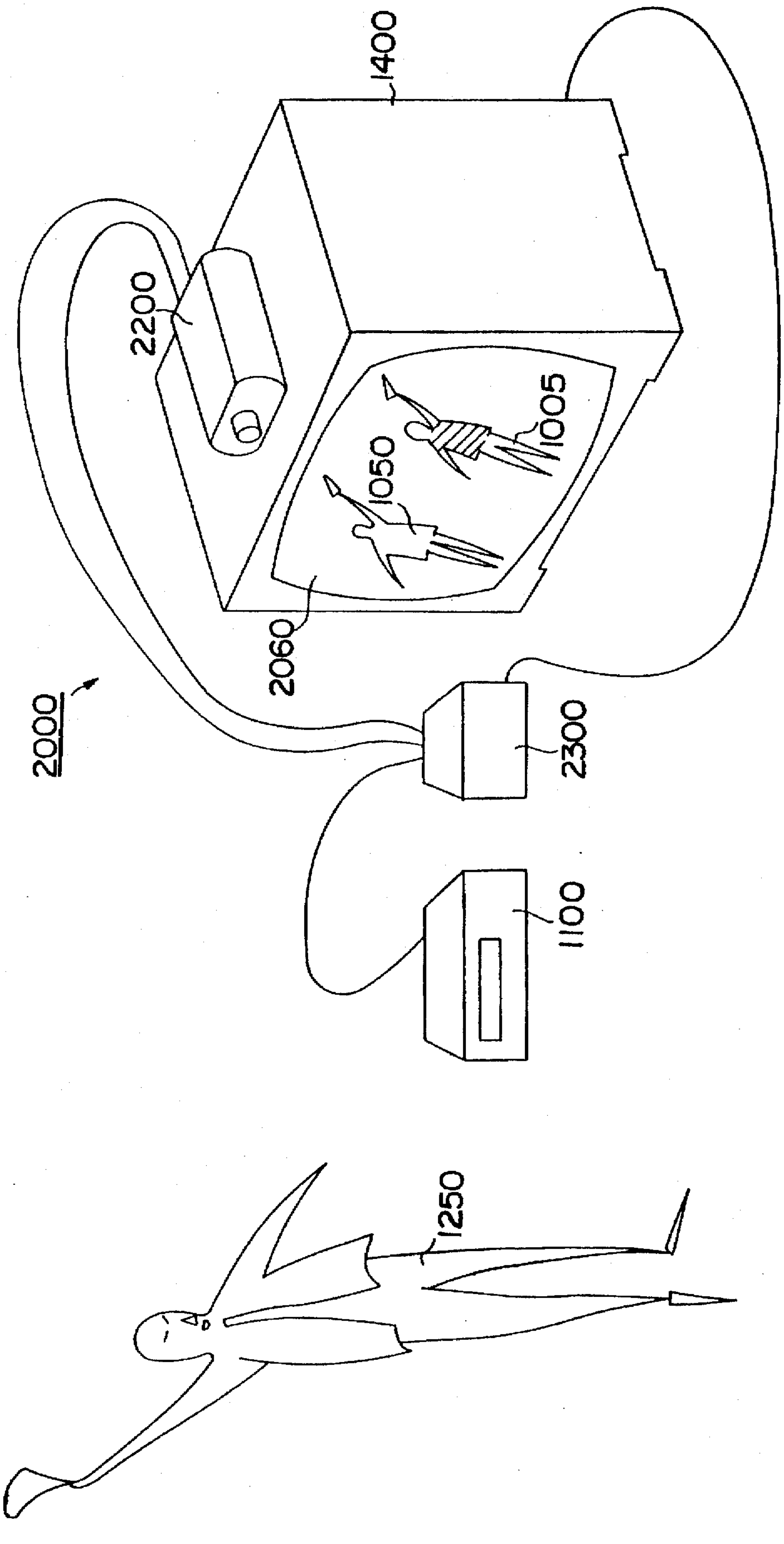
FIG. 7 illustrates an alternative electronic system utilizing the reversed image of the invention.

FIG. 7 shows a proposed method of image insertion which could also benefit, for the viewer's convenience, in following an activity, from reversal of the inserted image.

Camera 2200 captures the viewer's image in both visible light and infra-red. Both images are transmitted to infra-red key 2300. Also transmitted to infra-red key 2300 is a video image from VCR 1100.

In this case, video monitor 1400 produces a composite image of the reversed image 1050 of the viewer 1250 inserted into a prepared image including not only a bright image or images 1005, but also a bright prepared background 2060. This is accomplished by keying the image from VCR 1100 into the cold or non-viewer areas of the infra-red signal from camera 2200 and by keying the visible light signal from camera 2200 into the warm areas of the infra-red signal.

The system of FIG. 7 also allows electronic tracking of the viewer and is, in that respect, similar to chroma-key and difference key.

Use of a training video, particularly as described in the preferred embodiment of FIG. 2, can make possible well fitted inserts as discussed earlier. Once the viewer has learned a specific series of movements, the black background can give way to a less dark or bright scene. The bright scene is interrupted only in a small dark area which follows the prescribed motions previously learned by the viewer.

Figure 5:
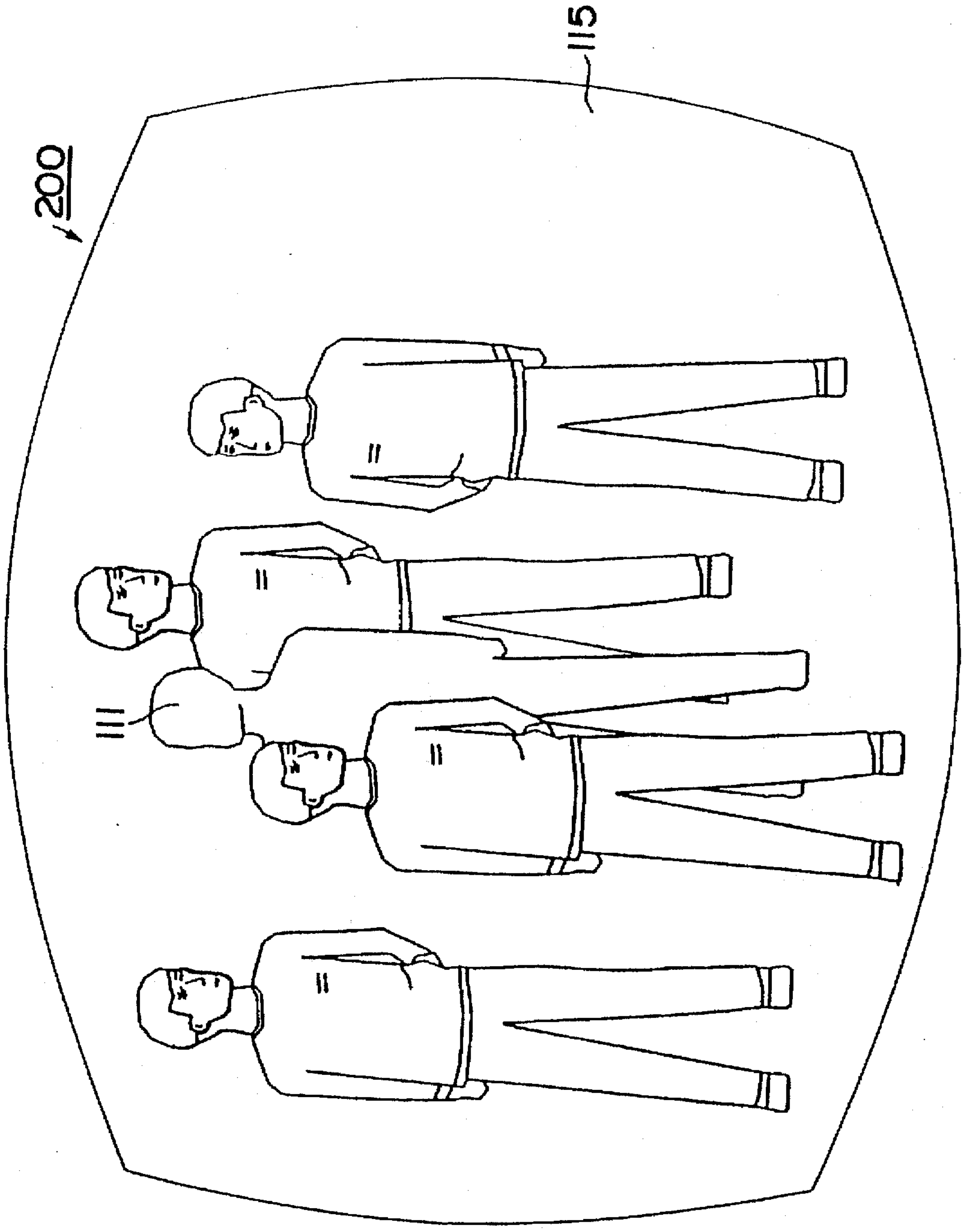
FIG. 5 illustrates a video screen showing a follow-up display incorporating an animated dark area.

FIG. 5 shows a display 200 utilizing a small dark area 111 within an otherwise bright scene 115. An especially strong illusion of interaction is presented by including image elements "before" and "behind" the dark area.

The preferred method of creating a dark area for this display format is to dress an actor totally in black and for the actor to follow the prescribed motions to be learned by the viewer from the preferred embodiment of the invention.

While the invention has been described with reference to preferred embodiments thereof, it will be appreciated by those of ordinary skill in the art that modifications can be made to the invention without departing from the spirit and scope thereof.

What is claimed is:

1. An illusion apparatus for forming a composite image of a viewer as part of a display, said apparatus comprising:

a display comprising a bright image on a dark background;

image forming means for forming an image of the viewer and the environment immediately surrounding the viewer on the dark background of said display, whereby the bright image appears to be inserted into the environment surrounding the viewer.

2. The illusion apparatus of claim 1 which further comprises display means for generating said display, wherein said display is an animated display wherein said bright image moves on said dark background.

3. The illusion apparatus of claim 2 wherein said display means comprises video storage means.

4. The illusion apparatus of claim 3 wherein said video storage means comprises a video tape.

5. The illusion apparatus of claim 3 wherein said image forming means comprises a luminance key adapted to be operatively connected to the output signal of a video camera and to the output signal of a video player adapted to receive and play said video storage means, and wherein said apparatus further comprises means for operatively connecting said luminance key to the input of a television monitor, whereby the image of the viewer and its environment is keyed to the dark background of the display.

6. The illusion apparatus of claim 3 which further comprises means for left-right reversal of the formed image of the viewer.

7. The illusion apparatus of claim 6, further comprising luminance key, wherein the luminance key and left-right reversal means are operatively connected to each other and include means for sending the luminance keyed and left-right reversed image of the viewer and the display to a television monitor.

8. The illusion apparatus of claim 1 wherein said image forming means comprises a partially reflective, partially transparent convex mirror located between the viewer and the display for making an image of the viewer and its environment appear to interact with the display, said mirror being convex in the direction of the viewer so as to diminish the size of the formed image of the viewer whereby the bright image appears to be within the environment of the viewer.

9. The illusion apparatus of claim 1 wherein the dark background comprises at least 50% of the display area.

10. The illusion apparatus of claim 1 wherein the dark background comprises at least 50% of the perimeter of the display.

11. The illusion apparatus of claim 1 wherein the display comprises a diorama.

12. The illusion apparatus of claim 1 wherein the display comprises a printed display.

13. The illusion apparatus of claim 3 wherein the bright image is of at least a first human.

14. The illusion apparatus of claim 13 wherein the display further comprises a second bright image which is of a human which is a right-left reversal of the first human.

15. A method for making a bright image of a display appear to be inserted within the environment of a viewer of the display, comprising the steps of:

providing a display comprising the bright image on a dark background, and forming an image of the viewer and the viewer's environment onto the dark background of the display, whereby the bright image appears to be within the environment of the viewer.

16. The method of claim 15 wherein the display is an animated video display which comprises transmitting a video image of the display to a television monitor, taking a video image of the viewer and the viewer's environment, and transmitting the video image of the viewer and the viewer's environment to the television monitor, whereby the video image of the bright image appears within the environment of the viewer on the television monitor.

17. The method of claim 16 which further comprises transmitting the video image of the display and the video image of the viewer and the viewer's environment to a luminance keying device to insert the image of the viewer and the viewer's environment onto the dark background of the display, and transmitting the signal from the luminance keying device to the television monitor.

18. The method of claim 16 which further comprises left-right reversing the image of the viewer.

19. Apparatus for forming an image of a viewer in a prerecorded video display comprising, a prerecorded video display comprising a bright image on a dark background, playing means for playing the prerecorded video display, a luminance key, first transmitting means for transmitting the video display from the playing means to the luminance key, camera means for capturing the image of a viewer and the viewer's environment and transmitting the captured image, reversing means for left-right reversing the viewer's image, said luminance key inserting the left-right reversed image into the dark background;

whereby displaying the resulting composite image on a video monitor will result in the bright image of the video display appearing to be inserted within the reversed environment of a viewer of the display.

20. A composite video for self-viewing comprising an image of a viewer and the environment surrounding the viewer inside of or on the surface of a display comprising a bright image on a dark background, the image of the viewer and the environment surrounding the viewer substantially covering the dark background, whereby the bright image appears to be inserted into the environment surrounding the viewer.

21. A video system useful for training a skill to a viewer thereof, said system comprising video storage means having stored therein a video display comprising a bright image of a trainer in motion corresponding to said skill on a dark background covering at least 50% of the area of the display, wherein the trainer addresses the dark background, and whereby insertion of an image of the viewer on the dark background enables the viewer to follow the motion of the trainer to thereby facilitate learning said skill.

22. The video system of claim 21 wherein the image of the trainer is left-right reversed.

23. The video system of claim 22 wherein the image of the trainer is produced by a camera elevated to the expected elevation of a viewer imaging device to be used at the time of viewing.

24. The video system of claim 21 further comprising image forming means for inserting an image of the viewer of the video display on the dark background of the display when the video display is displayed on a monitor.

25. The video system of claim 24 wherein the image forming means comprise a partially reflective, partially transparent convex mirror to be located between the viewer and the video display.

26. The video system of claim 24 wherein the image forming means comprises a video camera.

27. The video system of claim 26 further comprising a video storage means player for playing said video storage means and a luminance key for receiving the image of the viewer and the environment surrounding the viewer from the video camera and also for receiving the video display from the video storage means player, and means for left-right reversing the image of the viewer and the viewer's environment, said luminance key causing the left-right reversed image of the viewer as well as the left-right reversed image of the environment surrounding the viewer to be inserted onto the dark background of the video display to thereby make it appear that the bright image of the trainer is present in the environment surrounding the viewer.

28. A video display for creating a real time illusion of a viewer thereof as part of the display comprising a bright image on a dark background wherein a portion of the bright image comprises a vignetted interrupted edge in the area of the dark background where the viewer's image is expected to be inserted to thereby enhance the apparent interaction between the bright image and the viewer's image to be inserted.

29. A prerecorded videotape for use with illusion apparatus for making a composite image of a viewer and the viewer's surroundings appear to be part of the video display of the prerecorded videotape, said prerecorded videotape comprising an animated bright image moving on a dark background wherein the dark background comprises at least 50% of the area of the display and wherein said moving bright image addresses the dark background, whereby during playback of the videotape an image of the viewer and the viewer's surroundings may be juxtaposed onto the dark background to make it appear that the bright image is present in the environment surrounding the viewer together with and addressing the viewer.

30. An illusion apparatus for forming a composite image of a viewer as part of a display, said apparatus comprising a display comprising a bright image on a key background;

image forming means for forming an image of the viewer and the environment immediately surrounding the viewer on the key background of said display, wherein the bright image appears to be inserted into the environment surrounding the viewer.

31. The illusion apparatus of claim 30 wherein the key background is a chroma key background.

32. A video display comprising a real time left-right reversed image of the viewer of the display, wherein the real time reversed image is a component of a composite image.

33. The video display of claim 32 wherein said composite image comprises a key background and wherein said real time reversed image is keyed to said key background.

34. The video display of claim 33 wherein said background is a luminance key background.

35. The video display of claim 33 wherein said key background is a chroma key background.

36. The video display of claim 34 wherein said composite image further comprises a bright image on a dark background and wherein the bright image appears to be within the environment of the viewer of the video display.

37. The video display of claim 36 wherein said bright image represents a human.

38. The video display of claim 37 wherein the bright image representing a human is a left-right reversed image.

39. The video display of claim 38 wherein the bright image of the human comprises a demonstration of a physical skill.

* * * * *